Figure 1:
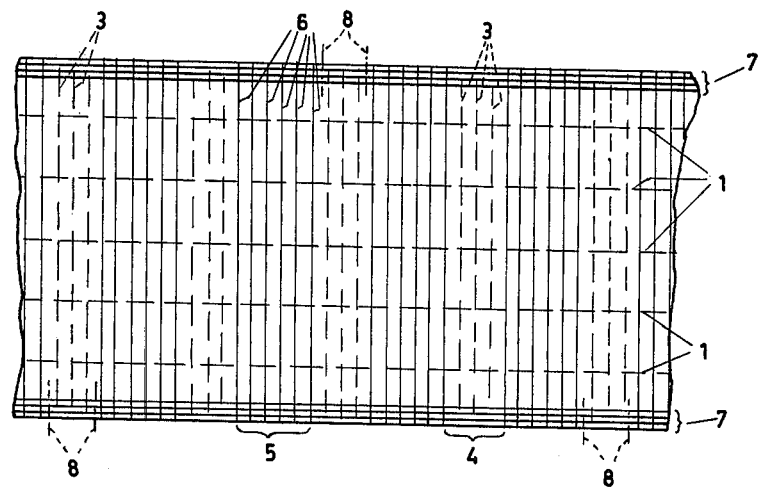

United States Patent [19]

de la Bretonière

[11] 3,946,194

[45] Mar. 23, 1976

[54] BUILDING COMPRISING ONE OR MORE ROOMS OR CONFINED SPACES EQUIPPED WITH AN ELECTRIC HEATING INSTALLATION, AND/OR AN ELECTRIC HEATING INSTALLATION FOR THIS BUILDING, EQUIPPED WITH A HEATING DEVICE

[76] Inventor: André B. de la Bretoière, Beethovenlaan 29, Doorwerth, Netherlands

[22] Filed: Nov. 18, 1974

[21] Appl. No.: 524,873

[30] Foreign Application Priority Data
Nov. 21, 1973 Netherlands..................... 7315916

[52] U.S. Cl. ................ 219/213; 219/345; 219/545; 219/549; 338/208
[51] Int. Cl.² ........................................ H05B 1/00
[58] Field of Search ........... 219/213, 345, 545, 549; 338/208

[56] References Cited
UNITED STATES PATENTS

| | | | |
|---|---|---|---|
| 2,327,756 | 8/1943 | Adamson | 219/545 |
| 2,533,409 | 12/1950 | Tice | 219/213 |
| 2,678,993 | 5/1954 | DeBoer | 219/545 X |
| 3,410,336 | 11/1968 | Eisler | 219/213 UX |
| 3,413,439 | 11/1968 | Eisler | 219/213 |
| 3,539,768 | 11/1970 | Eisler | 219/213 |
| 3,721,799 | 3/1973 | Carlstrom | 219/545 X |

*Primary Examiner*—C. L. Albritton
*Attorney, Agent, or Firm*—William A. Drucker

[57] ABSTRACT

A building comprising a number of confined spaces, at least one of which being provided with an electric heating installation provided on, in or in front of at least part of the walls, floor, ceiling and/or windows, said electric heating installation consisting of singular layers comprising electrically conductive heating wires and electrically insulating wires.

4 Claims, 4 Drawing Figures

BUILDING COMPRISING ONE OR MORE ROOMS OR CONFINED SPACES EQUIPPED WITH AN ELECTRIC HEATING INSTALLATION, AND/OR AN ELECTRIC HEATING INSTALLATION FOR THIS BUILDING, EQUIPPED WITH A HEATING DEVICE

The invention relates to a building comprising one or more rooms or confined spaces equipped with an electric heating plant, and furthermore relates to a heating plant for this building as well as to a curtain equipped with a heating device.

By far the majority of devices for the heating of enclosed spaces, such as rooms, halls and similar apartments operate by the use of heated circulating air, which means that heat transmission is effected by convection. Examples of such heating devices are afforded by central heating installations and by installations operating with conditioned air.

Pot-type stoves, fire places, radiators and similar heating devices likewise have a radiation component. As, however, with these latter there is powerful air circulation, the heating of the room or confined space is in these cases effected by radiation and convection.

The invention is based on the problem of providing, for the particular room or for each room of a building which is to be heated, an electric heating device of such a design that the room or rooms concerned are thereby heated exclusively, or substantially by radiation.

This problem is solved by the invention in that the walls, or parts thereof, which form the boundaries of the said room or of every room are provided with a thin layer of electrically conductive heating wires installed in electrically insulating material, which layer has heating wires placed inside it in such a scheme of distribution that the amount of heat delivered by the said walls in unit time per unit of surface area is substantially the same, which amount of heat depends upon the amount of electrical energy that is fed to the said layer.

Walls of a building or parts thereof shall here be understood to means the walls, floor and ceiling of the room, compartment or other space to be heated. The layer with its equipment of heating wires may, if so desired by provided with an electrically insulating, heat-conducting layer or covering so as to be concealed from view. As the heating wires are installed over the whole or substantially the whole surface of the layer, the outer surface of the covering radiates in a substantially uniform manner. Perfectly uniform radiation is obtained when the electrically insulating material used is a good conductor of heat, as for instance borium nitride, as in this way the layer acquires an identical temperature over its entire surface.

According to the invention the heating wires of the heating installation are subdivided into groups and equipped with switches between these groups in such a manner that the said groups can be switched into parallel, series or series-parallel connection, so that rapid and effective control of the temperature of the room is achieved.

According to the invention heat sensors are preferably provided for automatic operation of the switches.

The layer with its equipment of heating wires may, according to the invention, consist of a flexibly woven base of fabric having warp and weft threads of electrically insulating material in which electrically conductive feed wires are placed parallel to the warp threads, the said feed wires having heating wires placed between them which are electrically connected with these feed wires either integrally or in groups. A layer composed of a fabric of this kind offers the advantage that it is flexible and that the wires composed of electrically conductive material can be so installed that they are well distributed throughout the fabric. A still more advantageous heating installation according to the invention is characterized in that the layer consists of flexible fabric composed of electrically conductive material and having thin weft wires composed of electrically insulating material installed in the manner of alternate adjacent strips, wherein the borders of the fabric which are transverse to the weft wires of the fabric are composed of electrically conductive material and serve as current-feed wires, with which the electrically conductive weft threads make electrical contact, the said borders of the fabric having warp wires passing between them which consist of electrically insulating material. In this scheme, the borders of the fabric which are perpendicular to the weft threads are composed of thin, electrically conductive warp threads. A layer of this kind can be manufactured as a fabric composed entirely of textile material applying fabric techniques of prior art. By the removal of parts of the borders composed of electrically conductive material between the strips of weft threads composed of electrically conductive material, these weft threads can be brought into both series and parallel connection as well as into any desired form of series-parallel connection.

In order to obviate heat losses as far as is possible, the invention provides that a heat-insulating layer or a radiant-heat reflecting layer may be interposed between the heating layer and the walls of the particular room or of each room that is to be heated.

According to the invention any window inserted in the walls may be fitted with electric heating wires inserted in one or more curtains. In that case the invention also relates to a curtain provided with electric heating wires. An advantage afforded by the use of such a curtain is that any cold air between the window and the curtain is heated, so that it cannot produce any cold air current in the room to be heated. This provision also obviates the possibility that any dampness in the room to be heated might form a condensation film on the window panes, as the curtains hang close to the window pane and any water condensing on the window pane is therefore at once evaporated.

The invention will be further elucidated below with the aid of the drawings, in which a cross-section of a room in a building equipped with a heating installation according to the invention, part of a layer provided with heating wires and two schemes of connection according to the invention are shown diagrammatically by way of example.

Figure 2:
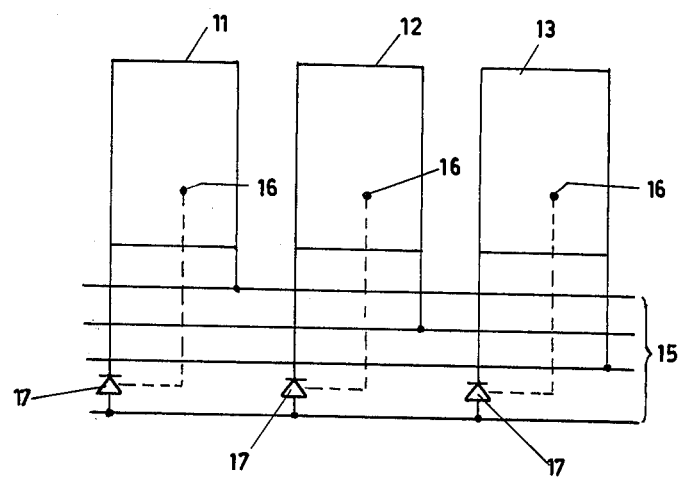
Figure 3:
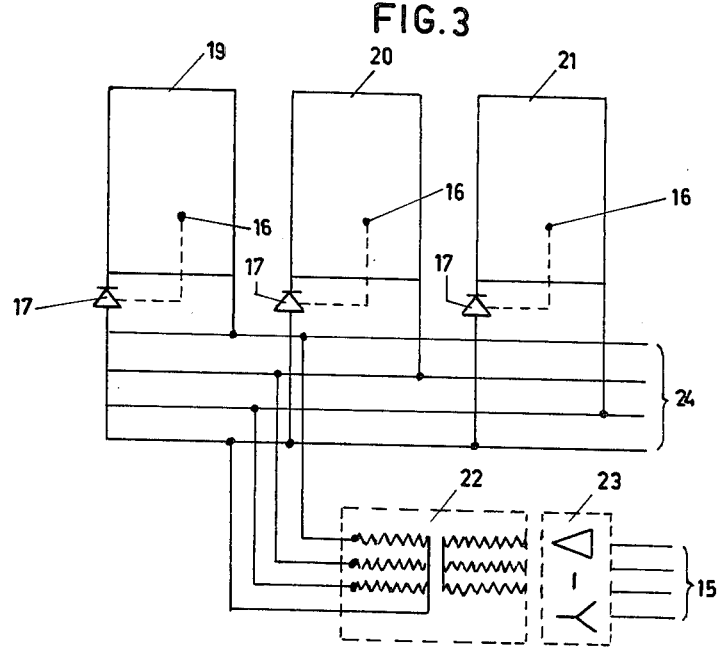
Figure 4:
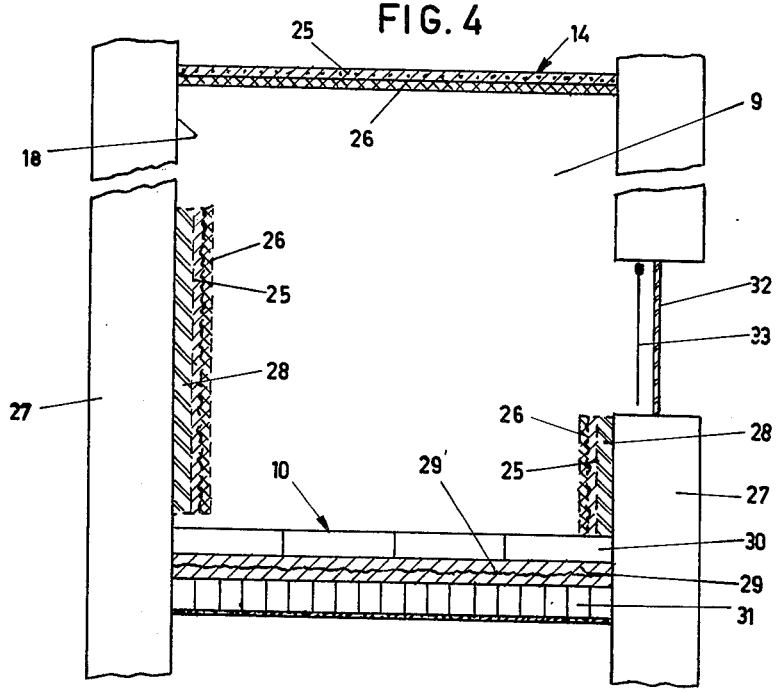

The drawings show:

FIG. 1 part of a fabric equipped with heating wires;

each of FIGS. 2 and 3 part of a scheme of connection of the heating installation according to the invention, and FIG. 4 part of a building, showing an apartment provided with a heating installation according to the invention.

The fabric shown in FIG. 1 consists of warp threads 1 of electrically insulating textile composed of synthetic material, fibre glass, rayon or other known weaving threads, such material being selected in accordance with the purpose for which the fabric is intended. An electrically high-insulating material that may find application is boron nitride, from which thin wires are made. Wires made of boron nitride not only possess good electrical insulation properties but are also good heat conductors, as a result of which the entire surface of the fabric can deliver heat in a uniform manner.

The warp wires 1 are installed between thin, electrically conductive bare wires 7 extending over the entire length of the fabric within its selvedges, to which wires the current-feed wires can be connected. The material used for these warp wires may for instance be copper.

The fabric further consists of weft wires 3 of electrically insulating material, which material may be the same as that used for the warp wires 1 of insulating material. The weft wires are installed in strips 4 of the fabric which are spaced at a distance from each other. In between these strips 4 are strips 5, which contain a plurality of thin, bare weft wires composed of electrically conductive material. These weft wires have a thickness which is preferably equal to or less than 0.05 mm. The material used for these weft wires may, for instance, be bare stainless steel or other conductive material. These thin, bare weft wires 6, by being woven, make good electrical contact with the continuous warp wires 7 of electrically conductive material.

When the electrically conductive warp wires 7 are connected to a source of electric current, all the strips 5 that are provided with weft wires composed of electrically conductive material are in parallel. By the removal of such portions of the warp wires 7 as are situated between the strips 4 of electrically insulating material, any desired scheme of series-parallel connection of a series connection of strips 5 can be achieved. In this way the fabric can be manufactured as a mass product and be made suitable for a variety of applications necessitating a very low or very high heat production per unit of surface area at a given voltage; it can, moreover, be adapted so as to conform to existing safety regulations, for instance the regulation whereby the required heat production has to be delivered at a "safe" voltage (42 V), or whereby the heat production itself must not be so great as to cause danger of fire.

FIG. 2 gives a diagrammatic representation of the particular part of the heating installation which is intended for heating the floor and ceiling of room 9 of a building, shown in FIG. 4. As can be seen from FIG. 2, the part of the heating installation that series for heating the floor 10 is subdivided into parts 11,12 which consist of a fabric according to FIG. 1 and are directly connected to a different phase of an A.C. mains supply 15, whilst the heating installation 13 for ceiling 14 of room 9 is connected to the third phase of the A.C. mains supply 15.

Parts 11,12 and 13 of the heating installation are each provided with a heat sensor which interacts with a regulator 17 having an adjusting knob for regulating the temperature of the apartment and for automatically disconnecting these parts. Devices of this kind operated by heat sensors are common knowledge in prior art and therefore need not be described in detail, as their construction does not per se form part of the invention.

FIG. 3 shows diagrammatically an embodiment of the particular part of the heating installation that is intended for heating the inner walls 18 of room 9. Each of these inner walls is equipped with a part 19,20,21 of the heating installation, which parts are constructed in the same way as parts 11,12 and 13 of FIG. 2 and are provided with heat sensors 16 and temperature controls 17. Parts 19,20 and 21, however, which do involve a risk of being touched on walls are not connected to the A.C. mains supply 15 directly but are each connected via a safety transformer 22 and a star-delta-switch 23 to one phase of a feed network 24 which has a lower voltage in accordance with the relevant safety regulations.

It will be obvious that for the feed of current to parts 11, 12 and 13 of the heating installation one may again use a lower voltage and that these parts may likewise be equipped with a different form of heating layer as shown in FIG. 1.

FIG. 4 shows diagrammatically a room 9 of a building equipped with a heating installation according to the invention. In this Figure the layer 25 of the ceiling and the walls are covered by an electrically insulating layer 26 which is provided with a decoration or to which a decorative layer, not shown in the drawing, can be applied, or the insulating and protecting decorative layer is interwoven with the heating fabric by the application of prior art weaving techniques. Between walls 27 and layer 25 a thermally insulating and/or radiant-heat reflecting layer 28 is provided, as a result of which little or no heat is lost by the heating of wall 27.

The floor 10 of room 9 consists of a layer of concrete 29 in which a heating fabric 29' is embedded. This layer of concrete is covered over with tiles 30. Under the layer of concrete 29 a honeycomb construction 31 of insulating material of sufficiently high mechanical strength is provided, which honeycomb construction has on its underside a layer of radiant-heat reflecting material, for instance aluminium foil.

In front of the window 32 there hangs a curtain 33 consisting of a fabric provided with heating wires, which fabric may for instance be of the form shown in FIG. 1.

As is evident from the foregoing, the invention aims at obtaining a heating installation with which the capacity required for operation is as low as possible and with which heat losses are reduced to a minimum, whilst optimum comfort to the persons in the room thus heated is ensured.

This endeavour runs concurrently with the achievement of a low power consumption, i.e. low costs for heating the room or rooms of a building. By using a heating installation according to the invention in a building constructed in accordance with the invention, a substantial saving of costs and power for heating the building is achievable as compared with a gas-fuelled central heating plant.

On the basis of tests with a heating installation carried out according to the invention in a building constructed in accordance with the invention, it can be calculated that in comparison with a 100% fuel consumption in the case of a gas-fuelled central heating plant, the fuel consumption can be cut down to 5–20% in terms of electric power.

To users, this unexpected result means that 75–5% can be saved annually on power costs, notwithstanding the fact that according to the invention "expensive" electricity is used.

For the power supply of a country, this means that 85–15% can be saved for generating electricity for heating purposes, with the result that the power supplies of that country will not only last longer, but also that the living environment will be less polluted. Therefore, the invention is not only economical to users but also to the whole country.

For further elucidation of this, the following example is given:

Taking as basis a cost price of 6 cents per kWh of day-time current and a 3.4 cents per kWh of night-time current, the average cost price under normal distribution of day-time and night-time current will be 4.5 cents per kWh.

Suppose that 1 m³ of natural gas is supplied at 7 cents per m³. With a central heating installation having maximum, minimum and nominal combustion values of 8000, 7200 and 6500 kcal per m³ of gas, the amount of thermal energy nominally obtained for 1 m³ of gas is 7.5 kWh, so that 1 kWh of heat generated by means of electricity is 4.5/0.95 = 4.75 dearer than gas.

Therefore, a decrease in consumption up to 5% means a decrease in cost of 5 × 4.75 = 24%, i.e. a saving in cost of about 75%.

For the generation and distribution of electricity it can roughly be calculated that from 1 m³ of natural gas approximately 3 kWh of electricity can be delivered. A decrease in consumption up to 5% on the part of the consumer thus means a reduction in fuel consumption at the electric power station of 15%, so that a saving of 85% in fuel consumption is obtained.

It will be evident that the invention is not limited to the embodiment described in the foregoing, but that it will permit a modification in numerous ways without departing from the scope of the invention.

I claim:

1. An electric heating system for at least one confined space of a building provided with an electric current source connectable therewith, said heating system consisting of thin heating layers comprising electrically conductive heating wires and interposed insulating wires, said heating layers distributed covering the entire boundary of said space so that each part of said boundary radiates the same amount of heat radiation in unit time per unit surface area, said amount of heat being controlled by the amount of electrical energy delivered to said heating system.

2. An electric heating system according to claim 1, characterized in that said thin heating layers comprise parallel strips of electrically conductive heating weft threads, said strips being separated from one another by strips of electrically insulating weft threads, the electrically conductive heating wires of each strip being connected at each of their ends with a strip of electrically conductive warp threads, warp threads of electrically insulating material being provided between said strips of electrically conductive warp threads.

3. An electrical heating system according to claim 2, wherein the boundary is provided with at least one window, characterized in that at least one said heating layer is provided at a small distance from and in front of said window.

4. An electric heating system according to claim 2 wherein the electrically insulating weft threads are of heat conductive material.

* * * * *